(12) United States Patent
Kogure

(10) Patent No.: US 7,280,641 B2
(45) Date of Patent: Oct. 9, 2007

(54) COMMUNICATION TERMINAL APPARATUS AND TRANSFER METHOD THEREFOR

(75) Inventor: Shinya Kogure, Gunma (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/926,941

(22) Filed: Aug. 27, 2004

(65) Prior Publication Data

US 2005/0047558 A1 Mar. 3, 2005

(30) Foreign Application Priority Data

Sep. 2, 2003 (JP) ............................ 2003-310225

(51) Int. Cl.
*H04M 11/00* (2006.01)
(52) U.S. Cl. .............. 379/88.14; 379/88.16; 379/88.17; 379/88.23
(58) Field of Classification Search ............ 379/88.11, 379/88.13, 88.14, 88.17, 88.27, 88.22, 88.23, 379/88.25
See application file for complete search history.

(56) References Cited

U.S. PATENT DOCUMENTS

| | | | | |
|---|---|---|---|---|
| 5,075,894 A | * | 12/1991 | Iwase et al. ................... 379/69 |
| 5,140,629 A | * | 8/1992 | Lee ............................... 379/70 |
| 5,479,411 A | * | 12/1995 | Klein ........................ 379/88.13 |
| 5,751,794 A | * | 5/1998 | Kugell et al. ............. 379/88.22 |
| 5,761,271 A | * | 6/1998 | Karnowski .................. 379/1.01 |
| 6,072,862 A | * | 6/2000 | Srinivasan ............. 379/100.08 |
| 6,389,114 B1 | * | 5/2002 | Dowens et al. ................ 379/52 |
| 6,389,276 B1 | * | 5/2002 | Brilla et al. ................. 455/413 |
| 6,477,494 B2 | * | 11/2002 | Hyde-Thomson et al. .. 704/260 |
| 6,603,837 B1 | * | 8/2003 | Kesanupalli et al. ..... 379/88.17 |
| 6,668,045 B1 | * | 12/2003 | Mow ........................ 379/88.19 |
| 6,807,254 B1 | * | 10/2004 | Guedalia et al. ........... 379/88.1 |
| 6,981,023 B1 | * | 12/2005 | Hamilton et al. ........... 709/206 |
| 7,027,568 B1 | * | 4/2006 | Simpson et al. ......... 379/88.16 |
| 2002/0145753 A1 | | 10/2002 | Inoue et al. ............... 358/1.15 |
| 2003/0182384 A1 | | 9/2003 | Kogure et al. .............. 709/206 |
| 2005/0018657 A1 | | 1/2005 | Nakao et al. ............... 370/352 |

FOREIGN PATENT DOCUMENTS

| | | |
|---|---|---|
| JP | 05199295 | 8/1993 |
| JP | 11177791 | 7/1999 |
| JP | 2110-077942 | * 3/2001 |
| JP | 2001077942 | 3/2001 |
| JP | 2001-331417 | 11/2001 |
| JP | 2002077366 | 3/2002 |
| JP | 2002152320 | 5/2002 |

* cited by examiner

*Primary Examiner*—Fan Tsang
*Assistant Examiner*—Simon Sing
(74) *Attorney, Agent, or Firm*—Fitzpatrick, Cella, Harper & Scinto

(57) ABSTRACT

Messages from a remote telephone set are automatically recorded as automatically recorded data by an answering function. An e-mail transmission/reception unit stores e-mail received from an e-mail server in a received mail file. An automatically recorded message and voice data obtained by converting the text data of received e-mail into voice data by a voice synthesizing unit are transferred to a transfer destination on the basis of information indicating whether or not to transfer the e-mail and automatically recorded message.

3 Claims, 8 Drawing Sheets

ABOUT US 7,280,641 B2

COMMUNICATION TERMINAL APPARATUS AND TRANSFER METHOD THEREFOR

FIELD OF THE INVENTION

The present invention relates to a technique of converting text data into voice data and transferring it.

BACKGROUND OF THE INVENTION

Some conventional telephone sets with an answering function include an information transfer function of recording an incoming call upon reception of the call in user absence and transferring the recorded contents to a portable terminal or the like on the road. With the recent advances in the performance of fixed telephone sets for home use, a terminal which can transmit/receive e-mail as well as performing voice communication and facsimile transmission/reception has become available. As a consequence, the number of types of data which can be handled by fixed telephone sets has increased.

A conventional technique directed to facilitate using both an answering service and a mail service is disclosed in, for example, patent reference (Japanese Patent Laid-Open No. 2001-331417). The technique disclosed in patent reference is associated with a mail conversion system which can store e-mail as voice data in a message box upon voice conversion or can freely exchange voice messages and e-mail by transmitting recorded voices as e-mail upon document conversion.

According to the prior art described above, an automatically recorded message is handled as voice data, and e-mail is handled as text data. Although there have been some systems which can convert an automatically recorded message into text data upon document conversion or can convert e-mail into voice data upon voice conversion, there have been no systems which can transfer the two types of data to a portable terminal or the like on the road by one communication.

SUMMARY OF THE INVENTION

The present invention has been made to solve the above problem and, has as its object to convert text data into voice data and transfer it together with other voice data to an external communication terminal apparatus by one communication.

In order to achieve the above object, according to an aspect of the present invention, there is provided a communication terminal apparatus which converts text data into voice data and transfers the data, comprising:

recording means for recording a message from a remote device by using an answering function in response to an incoming call from the remote device;

reception means for receiving e-mail from a remote device through a communication line;

conversion means for converting text data of the e-mail received by the reception means into voice data; and transfer means for transferring the voice data converted by the conversion means and the message recorded by the recording means to a predetermined communication terminal apparatus, wherein the transfer means transfers at least the voice data and the message to the predetermined communication terminal apparatus on the basis of information indicating whether or not to transfer at least the voice data and the message.

According to another aspect of the present invention, there is provided a transfer method for a communication terminal apparatus which converts text data into voice data and transfers the data, comprising:

a recording step of recording a message from a remote device by using an answering function in response to an incoming call from the remote device;

a reception step of receiving e-mail from a remote device through a communication line;

a conversion step of converting text data of the e-mail received in the reception step into voice data; and a transfer step of transferring the voice data converted in the conversion step and the message recorded in the recording step to a predetermined communication terminal apparatus, wherein, in the transfer step, at least the voice data and the message are transferred to the predetermined communication terminal apparatus on the basis of information indicating whether or not to transfer at least the voice data and the message.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The best mode for carrying out the present invention will be described below with reference to the accompanying drawings. As an example of a communication terminal apparatus according to the present invention, an e-mail terminal having an answering function and e-mail transmission/reception function will be described.

First Embodiment

The arrangement of an e-mail terminal according to the first embodiment will be described first.

Figure 1:
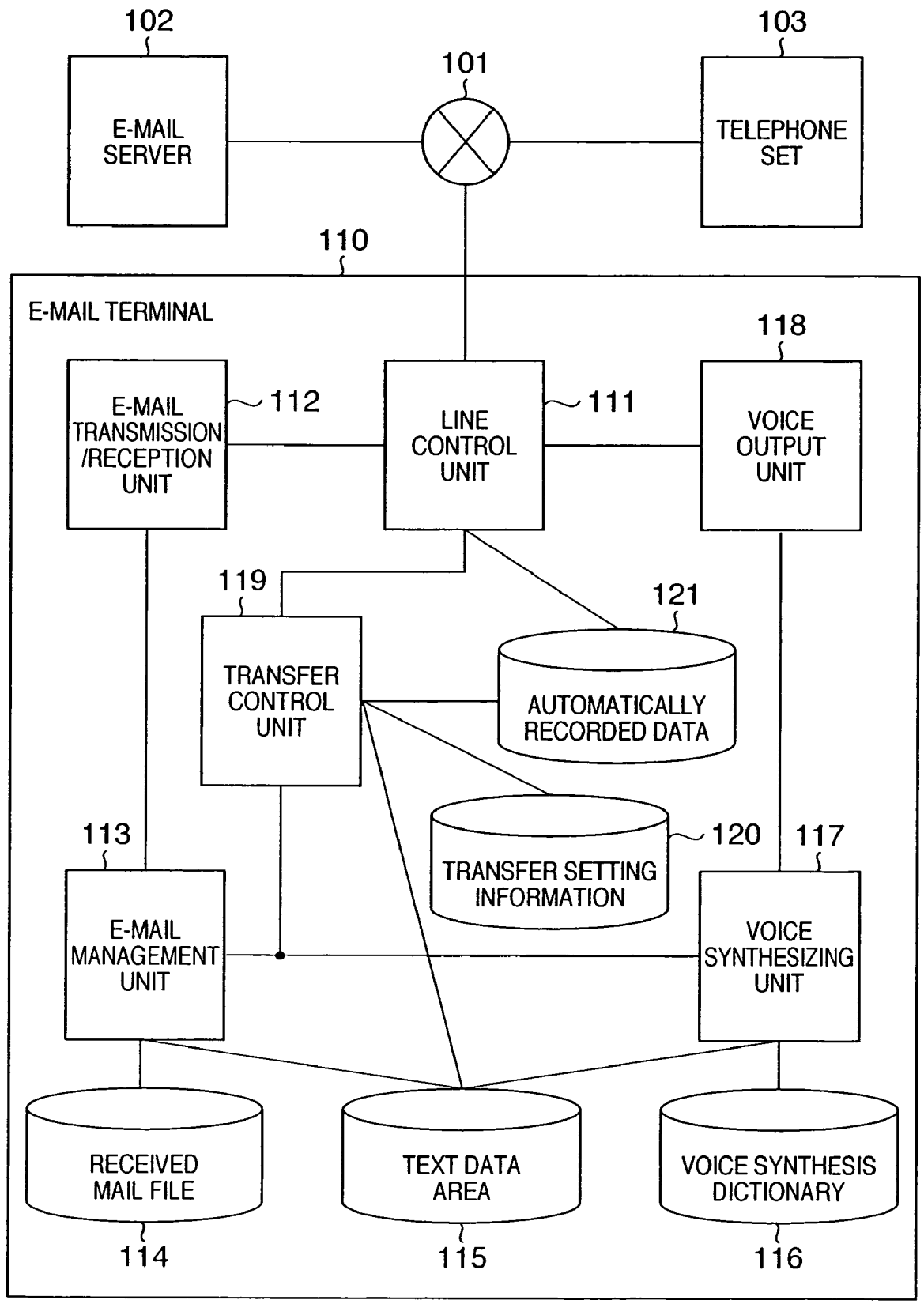
FIG. 1 is a block diagram showing the schematic arrangement of an e-mail terminal according to the first embodiment.

FIG. 1 is a block diagram showing the schematic arrangement of the e-mail terminal according to the first embodiment. Referring to FIG. 1, reference numeral 101 denotes a communication line such as a PSTN, ISDN, or IP telephone network to which the e-mail terminal is connected; 102, an e-mail server which is connected to the communication line 101 to store e-mail; 103, a telephone set connected to the communication line 101; and 110, an e-mail terminal according to the first embodiment.

The telephone set 103 may be a mobile device such as a cell phone or PDA (Personal Digital Assistants) instead of a fixed telephone set.

Assume that e-mail is transmitted/received between the e-mail server 102 and the e-mail terminal 110 by a protocol such as SMTP (Simple Mail Transfer Protocol)/POP3 (Post Office Protocol-Version 3).

In the e-mail terminal 110, reference numeral 111 denotes a line control unit serving as an interface which controls communication with the communication line 101; 112, an e-mail transmission/reception unit which transmits/receives e-mail to/from the e-mail server 102 through the line control unit 111 by a predetermined protocol; 113, an e-mail management unit which stores received e-mail as a received mail file (to be described later) in a memory and manages it; 114, a received mail file; 115, a text data area; and 116, a voice synthesis dictionary.

Reference numeral 117 denotes a voice synthesizing unit which copies the received mail file 114 to the text data area 115 and converts the file into voice data by using the voice synthesis dictionary 116; 118, a voice output unit which outputs the voice data obtained by the voice synthesizing unit 117 upon voice synthesis; and 119, a transfer control unit which manages transfer setting information 120 to perform data transfer and, when a data transfer instruction is received, transfers the voice data of the received mail file 114 which is created by the voice synthesizing unit 117 and a message from a remote apparatus which is recorded by the answering function in accordance with transfer setting information 120.

The e-mail terminal 110 includes a telephone unit functioning as a telephone set. Upon reception of an incoming call from the telephone set 103, the e-mail terminal 110 can perform voice communication in response to the incoming call. In addition, the e-mail terminal 110 can automatically answer an incoming call by the answering function and record a message from a communication partner as an automatically recorded message in the form of automatically recorded data 121. This telephone unit may be a known one, and a description thereof will be omitted.

Figure 2:
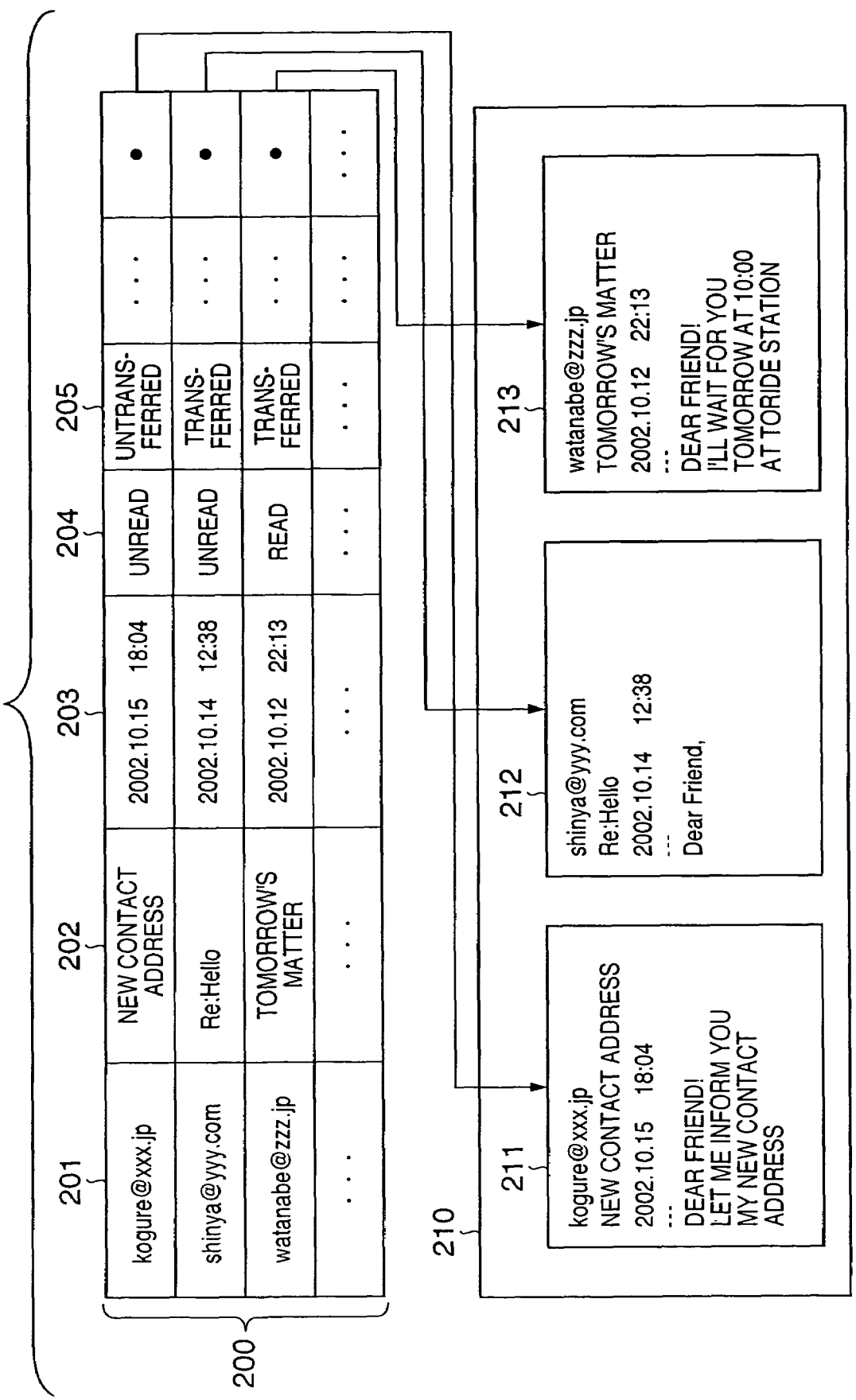
FIG. 2 is a view showing the detailed arrangement of a received mail file 114.

FIG. 2 is a view showing the detailed arrangement of the received mail file 114. As shown in FIG. 2, the received mail file 114 is comprised of a received mail management portion 200 which manages the state of received mail and a received mail main body portion 210 which stores the state of received e-mail. The following information is recorded on the received mail management portion 200 for each received mail: a sender 201 of received mail, a subject matter 202, a reception date 203, a state 204 indicating whether or not the mail has been read, and a state 205 indicating whether the mail has been transferred. These pieces of information are associated with mail data 211, 212, and 213 of the received mail main body portion 210, respectively. An unread mail count and untransferred mail count in the terminal 110 can be calculated on the basis of the respective pieces of information in the received mail management portion 200.

Figure 3:
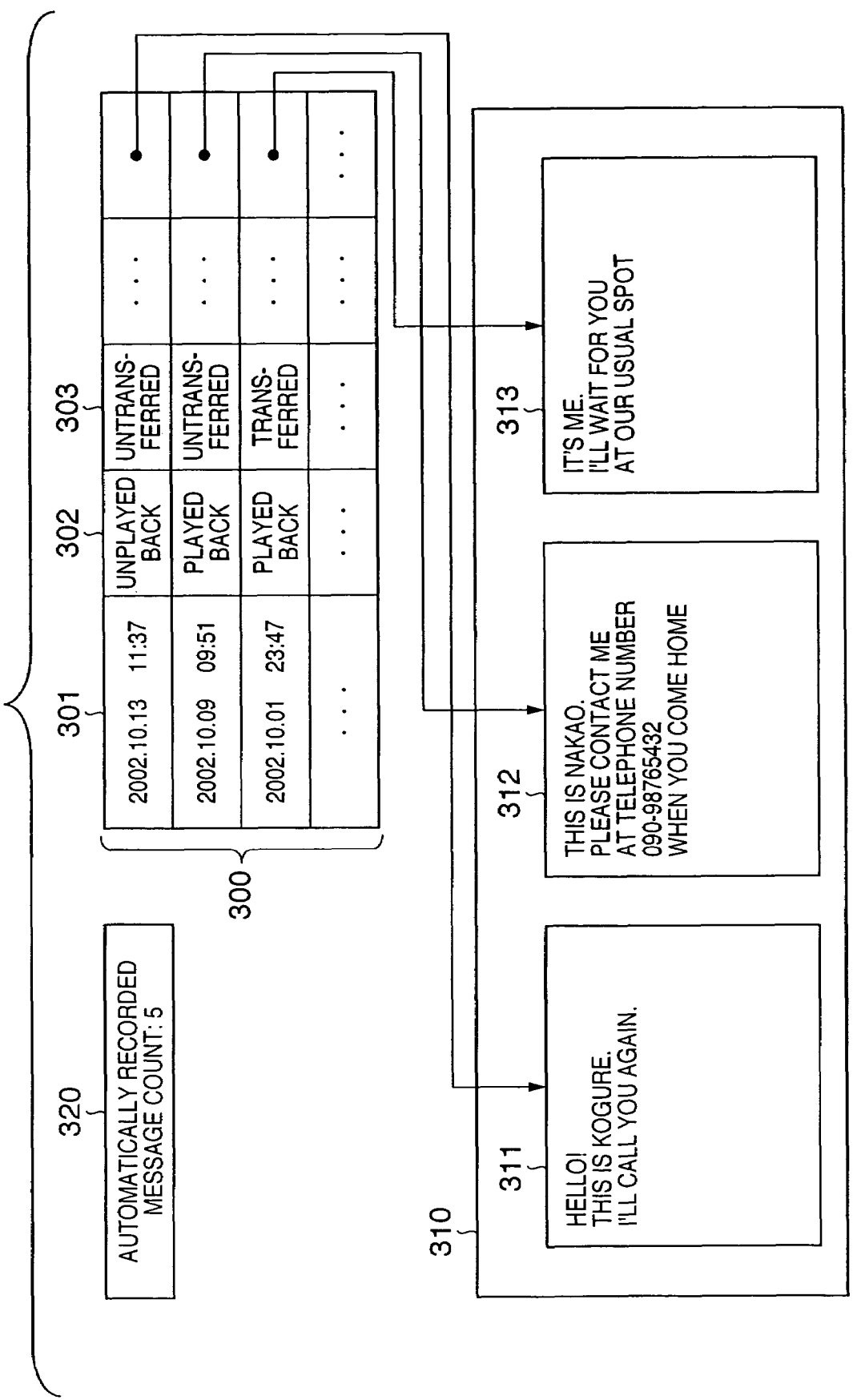
FIG. 3 is a view showing the detailed arrangement of automatically recorded data 121.

FIG. 3 is a view showing the detailed arrangement of the automatically recorded data 121. As shown in FIG. 3, the automatically recorded data 121 is comprised of an automatically recorded message management portion 300 which manages the state of automatically recorded messages, an automatically recorded message main body 310 in which automatically recorded messages are recorded, and an automatically recorded message count portion 320. The following information is recorded in the automatically recorded message management portion 300 for each automatically recorded message: a recording date 301, a state 302 indicating whether or not the automatically recorded message has been played back, a state 303 indicating whether or not the automatically recorded message has been transferred, and the like. The automatically recorded message count portion 320 increments the automatically recorded message count by one when one message is automatically recorded, and decrements the count by one when one automatically recorded message is deleted. When all the automatically recorded messages are deleted, the count is rewritten by 0.

Figure 4:
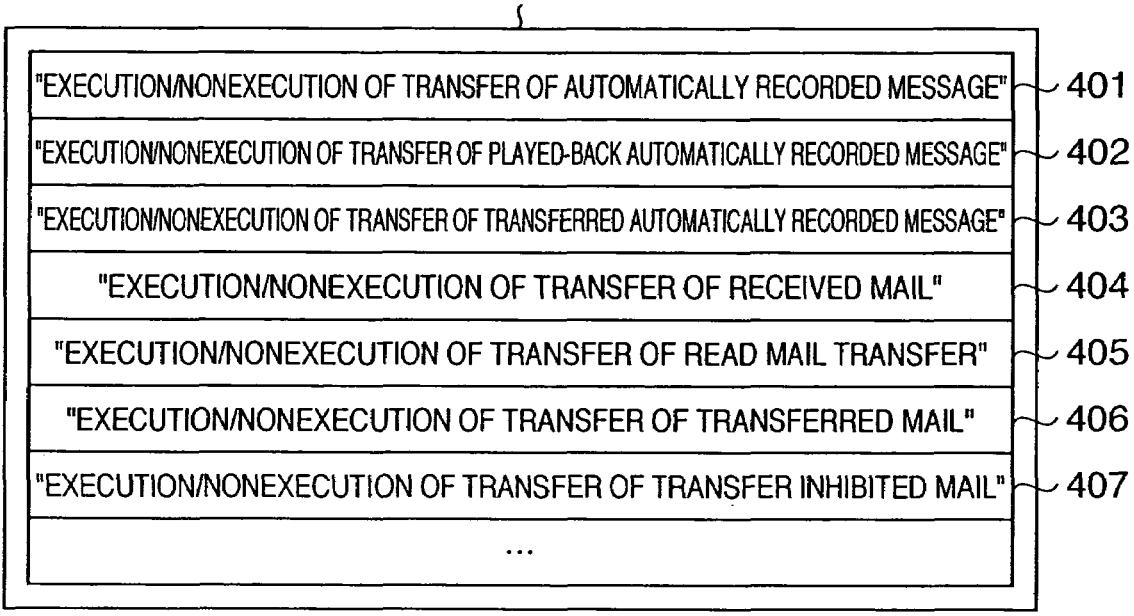
FIG. 4 is a view showing the details of information set as transfer setting information 120.

FIG. 4 is a view showing the detailed information set as the transfer setting information 120. As shown in FIG. 4, as the transfer setting information 120, a transfer setting management portion 400, transfer inhibition information 410, and transfer destination telephone number 420 are set. The following information is set in the transfer setting management portion 400: "execution/nonexecution of transfer of automatically recorded message" 401 indicating whether or not to transfer an automatically recorded message, "execution/nonexecution of transfer of played-back automatically recorded message" 402 indicating whether or not to transfer a played-back automatically recorded message, "execution/nonexecution of transfer of transferred automatically recorded message" 403 indicating whether or not to transfer a transferred automatically recorded message, "execution/nonexecution of transfer of received mail" 404 indicating whether or not to transfer received mail, "execution/nonexecution of transfer of read mail" 405 indicating whether or not to transfer read received mail, "execution/nonexecution of transfer of transferred mail" 406 indicating whether or not to transfer transferred received mail, "execution/nonexecution of transfer of transfer inhibited mail" 407 indicating whether or not to transfer received mail set in a transfer inhibition state, and the like.

The information of received mail set in the transfer inhibition state is set in the transfer inhibition information 410. Inhibition settings are comprised of an inhibition item 411 such as a sender and an inhibition condition 412 indicating the contents of the item.

In this case, whether or not to transfer an automatically recorded message or received mail is determined on the basis of the information set in the transfer setting management portion 400, the state of the automatically message management portion 300, and the state of the received mail management portion 200. More specifically, if "nonexecution of transfer of automatically recorded message" is set in "execution/nonexecution of transfer of automatically recorded message" 401, the automatically recorded message is not transferred. In addition, if "nonexecution of transfer of played-back automatically recorded message" is set in "execution/nonexecution of transfer of played-back automatically recorded message" 402, the state 302 indicating whether or not the automatically recorded message has been played back in the automatically message management portion 300 is checked, and no transferred automatically recorded message is transferred. If "nonexecution of transfer of transferred automatically recorded message" is set in "execution/nonexecution of transfer of transferred automatically recorded message" 403, the state 303 indicating whether or not the automatically recorded message has been transferred in the automatically message management portion 300 is checked, and no transferred automatically recorded message is transferred.

Likewise, if "nonexecution of transfer of received mail is set in "execution/nonexecution of transfer of received mail" 404, received mail is not transferred. If "nonexecution of transfer of read mail" is set in "execution/nonexecution of transfer of read mail transfer" 405, the state 204 in the received mail management portion 200 which indicates whether or not the mail has been read is checked, and no read received mail is transferred. If "nonexecution of transfer of transferred mail" is set in "execution/nonexecution of transfer of transferred mail" 406, the state 205 in the received mail management portion 200 which indicates whether or not the mail has been transferred is checked, and no transferred received mail is transferred. If "nonexecution of transfer of transfer inhibited mail" is set in "execution/ nonexecution of transfer of transfer inhibited mail" 407, received mail corresponding to transfer inhibition information 410, of the received mail managed in the received mail management portion 200, is not transferred.

Limiting automatically recorded messages and received mail to be transferred in accordance with the transfer setting information 120 in this manner prevents unnecessary information from being transferred.

The processing in which the e-mail terminal 110 converts received e-mail into voice data and transfers it together with automatically recorded message to a transfer destination will be described next.

Figure 5A:
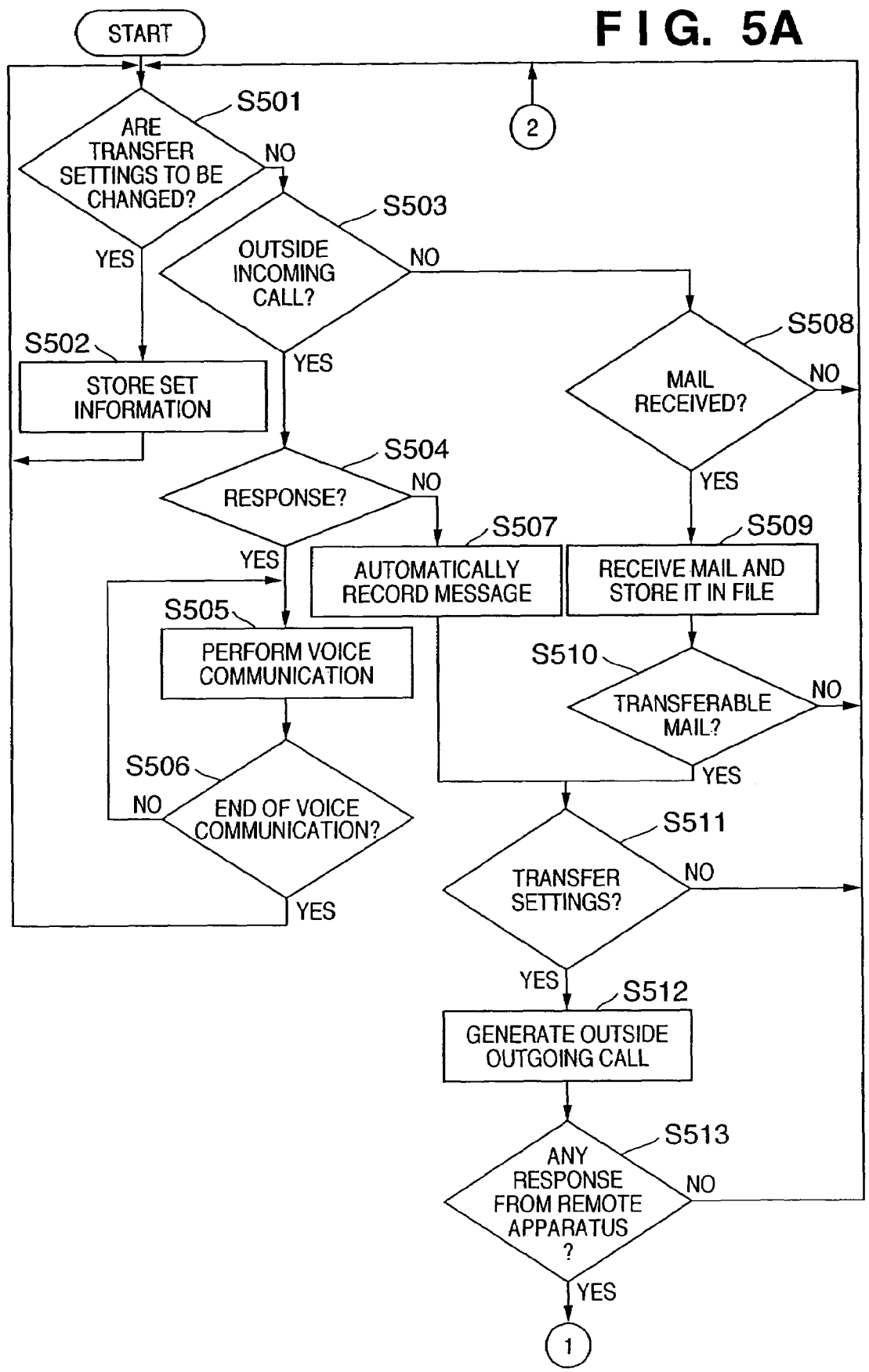
FIGS. 5A and 5B are flowcharts showing transfer processing of e-mail in the first embodiment.
Figure 5B:
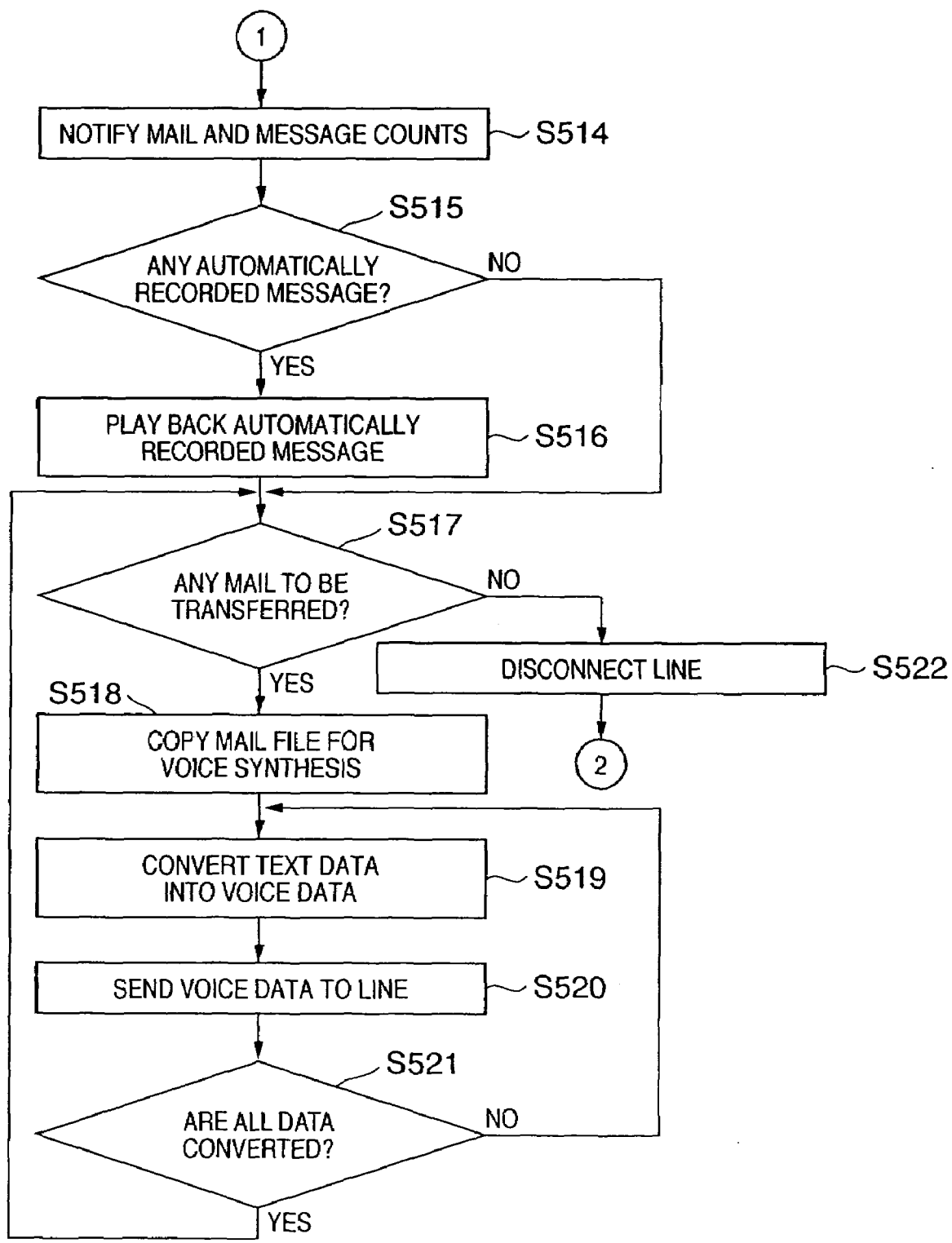

FIGS. 5A and 5B are flowcharts showing transfer processing for e-mail in the first embodiment. First of all, when the user presses a menu key of an operation unit (not shown) in the e-mail terminal 110 in the standby state, the state of the terminal shifts to an e-mail transfer setting state. If a key for changing the settings is pressed (YES in step S501), the transfer control unit 119 displays a display window (not shown) for changing the transfer setting information 120 of the transfer setting management portion 400, transfer inhibition information 410, and transfer destination telephone number 420 shown in FIG. 4. Thereafter, if the user finishes the setting change, the transfer setting information 120 is stored (step S502), and the terminal returns to the standby state.

If the e-mail terminal 110 in this standby state receives an incoming call from the telephone set 103 through the communication line 101 (YES in step S503), and the user responds to this outside incoming call (YES in step S504), a voice communication state is set (step S505). When the voice communication finishes afterward (YES in step S506), the terminal returns to the standby state. If an incoming call from the telephone set 103 is received through the communication line 101 (YES in step S503), and the user does not respond to the outside incoming call even after the lapse of the designated time (NO in step S504), the e-mail terminal 110 automatically responds to the call by the answering function. In this case, a message from the telephone set 103 is recorded as an automatically recorded message in the form of the automatically recorded data 121 (step S507).

In the e-mail terminal 110 in the standby state, the e-mail transmission/reception unit 112 inquires of the e-mail server 102 whether or not any e-mail has been terminated through a predetermined protocol. If e-mail has been terminated (YES in step S508), the e-mail terminal 110 receives the e-mail from the e-mail server 102, and the e-mail management unit 113 stores the e-mail in the received mail file 114 (step S509). The transfer control unit 119 then determines on the basis of the transfer setting information 120 whether or not to transfer the received e-mail. If the condition that inhibits the transfer of e-mail is met (NO in step S510), the terminal returns to the standby state.

Note that the condition that inhibits the transfer of e-mail is a condition in which "execution/nonexecution of transfer of received mail" 404 shown in FIG. 4 is set to "nonexecution of transfer of received mail" or "execution/nonexecution of transfer of transfer inhibited mail" 407 is set to "nonexecution of transfer of transfer inhibited mail" and the e-mail matches the transfer inhibition information 410.

If new message is recorded by the above answering function (step S507) or new e-mail that can be transferred is received (YES in step S510), the transfer control unit 119 determines on the basis of the transfer setting information 120 whether or not the above new message or new e-mail meets the condition of transfer inhibition. If the condition of transfer inhibition is met (NO in step S511), the terminal returns to the standby state. If the condition of transfer inhibition is not met (YES in step S511), the line control unit 111 generates an outside outgoing call to the transfer destination telephone number 420 set in the transfer setting information 120 (step S512). In this case, if no response is received from the telephone set (transfer destination telephone set) corresponding to the transfer destination telephone number 420 (NO in step S513), the terminal returns to the standby state.

If an outside outgoing call is generated for transfer (step S512), and the transfer destination telephone set responds to it (YES in step S513), the transfer control unit 119 performs transfer processing for the transfer destination telephone set. In this transfer processing, first of all, a received mail count and automatically recorded message count are notified (step S514). The received mail management portion 200 calculates this received mail count, and the value of the automatically recorded message count 320 is used as this automatically recorded message.

If it is determined on the basis of the automatically recorded data 121 and transfer setting information 120 that there is an automatically recorded message to be transferred (YES in step S515), the message recorded in the automatically recorded message main body 310 of the automatically recorded data 121 is played back and transferred through the line control unit 111 and communication line 101. The state 302 indicating whether or not the automatically recorded message has been played back in the automatically message management portion 300 which corresponds to the message is changed to a state indicating that the message has been played back, and the state 303 indicating whether or not the automatically recorded message has been transferred is changed to a state indicating that the message has been transferred (step S516).

The transfer control unit 119 determines on the basis of the transfer setting information 120 whether or not each e-mail stored in the received mail file 114 by the e-mail management unit 113 is mail to be transferred. If there is no mail to be transferred (NO in step S517), the line control unit 111 disconnects the connected line (step S522), and the terminal returns to the standby state.

If it is determined that there is e-mail to be transferred (YES in step S517), the corresponding e-mail is read out from the received mail file 114, and the voice synthesizing unit 117 copies the mail to the text data area 115 (step S518). The voice synthesizing unit 117 then converts the e-mail in the text data area 115 into voice data by referring to the voice synthesis dictionary 116 (step S519). The voice output unit 118 plays back the voice data converted by the voice synthesizing unit 117 and transfers it through the line control unit 111 and communication line 101 (step S520). In this case, the state 205 indicating whether the mail has been transferred in the received mail management portion 200 which corresponds to the transferred received mail is changed to a state indicating that the mail has been transferred.

If e-mail to be transferred is copied to the text data area 115 and transferred while being converted into voice data in this manner, and all the e-mail in the text data area 115 is transferred (YES in step S521), it is continuously determined whether or not there is any corresponding e-mail in the received mail file 114 (step S517). If all the corresponding e-mail is transferred (NO in step S517), the connected line is disconnected (step S522), and the terminal returns to the standby state.

In this case, the transfer order of automatically recorded message and e-mail may be reversed. In addition, both messages and e-mail may be sorted together in the terminating date order or the like and transferred.

According to the first embodiment, when a message is automatically recorded on an answering telephone set at home and new e-mail is received, two types of data, i.e., an automatically recorded message and e-mail, can be handled as one type of data, i.e., voice data, owing to voice synthesis, and can be transferred to a portable terminal or the like on the road by one voice communication.

In addition, inhibiting the transfer of automatically recorded message that has been played back or transferred once or e-mail that has been displayed once can reduce the voice communication count and time.

Furthermore, registering in advance conditions for e-mail which the user does not want to transfer and inhibiting any e-mail that meets the registered conditions can reduce the voice communication count and time.

Moreover, transferring an automatically recorded message count and e-mail count together with automatically recorded messages and e-mail makes it easy to grasp information about data to be transferred.

Second Embodiment

The second embodiment of the present invention will be described in detail next with reference to the accompanying drawings. Note that the arrangement of an e-mail terminal according to the second embodiment is the same as that described in the first embodiment, and hence a description thereof will be omitted.

Figure 6A:
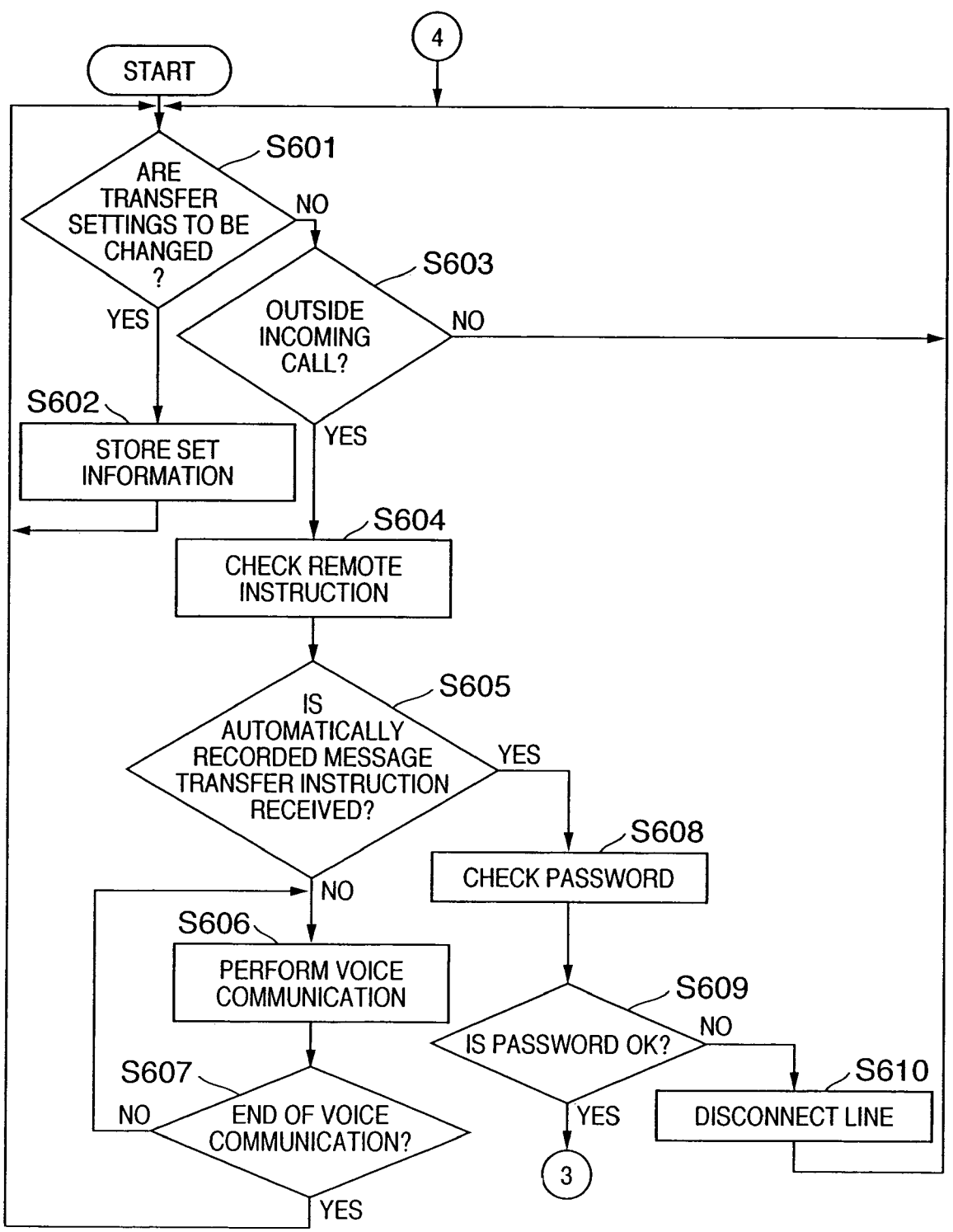
FIGS. 6A and 6B are flowcharts showing transfer processing of e-mail in the second embodiment.
Figure 6B:
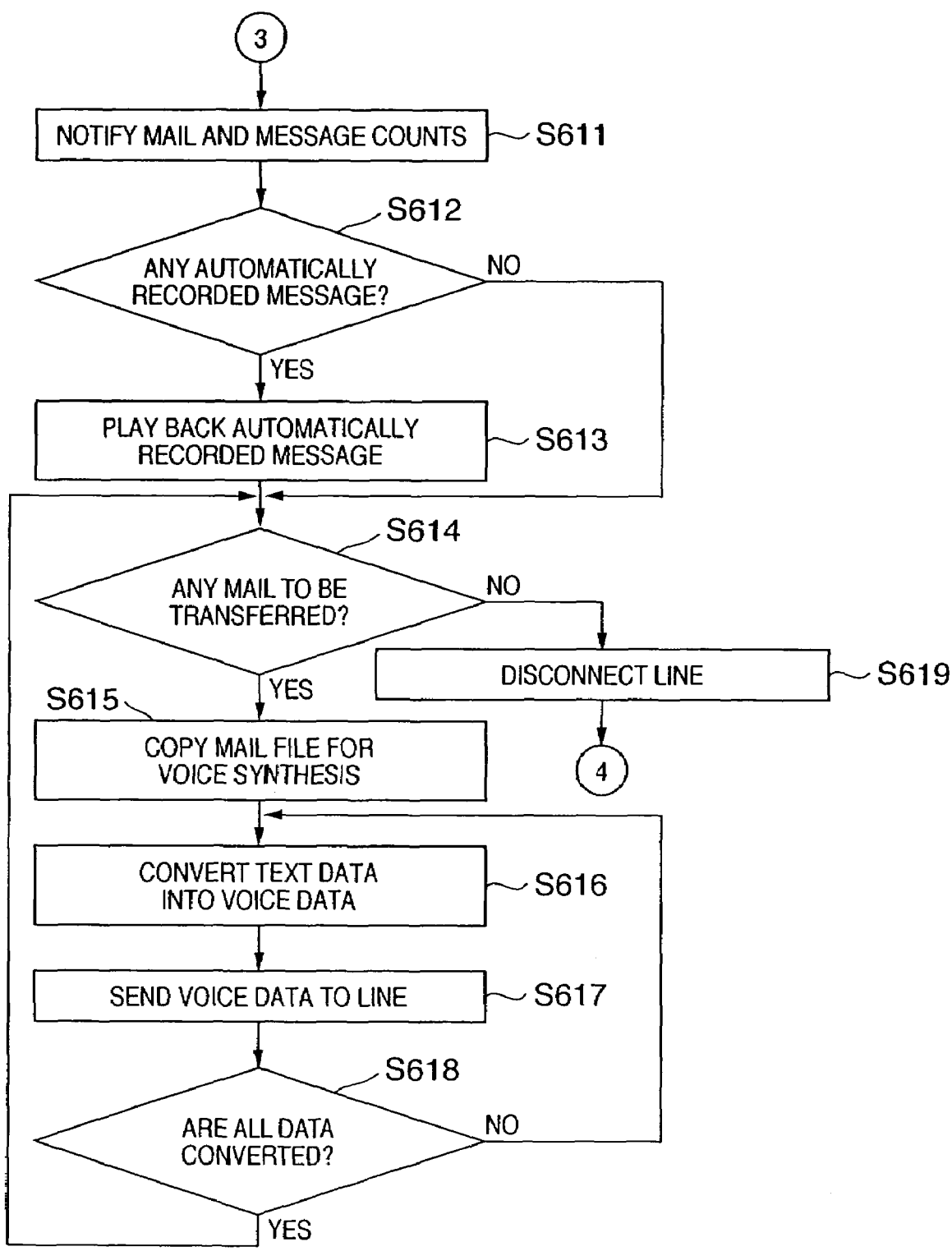

FIGS. 6A and 6B are flowcharts showing transfer processing of e-mail in the second embodiment. When the user presses a menu key of an operation unit (not shown) of an e-mail terminal 110 in the standby state, the terminal shifts to an e-mail transfer setting state. When a key for changing the settings is pressed (YES in step S601), a transfer control unit 119 displays, on a display device (not shown), a display window for setting/changing transfer setting information 120 of a transfer setting management portion 400, transfer inhibition information 410, and transfer destination telephone number 420 shown in FIG. 4. When the user finishes the setting/changing operation afterward, the transfer setting information 120 is stored (step S602), and the terminal returns to the standby state.

If the e-mail terminal 110 in the standby state receives an incoming call from a telephone set 103 through a communication line 101 (YES in step S603), a line control unit 111 checks whether or not a remote instruction is received from the telephone set 103 (step S604). If no remote instruction is received from the telephone set 103 (NO in step S605), a voice communication state is set (step S606). When the voice communication finishes afterward (step S607), the terminal returns to the standby state. It suffices if this remote instruction is an instruction determined in advance by a voice or PB signal.

If the line control unit 111 receives a remote instruction from the telephone set 103 and the instruction is an automatically recorded message transfer instruction (YES in step S605), an authentication check is performed by a password (step S608). If the input password differs from the pre-registered password (NO in step S609), the line is disconnected (step S610), and the terminal returns to the standby state. If the password is authenticated (YES in step S609), the transfer control unit 119 performs transfer processing. In this transfer processing, first of all, a received mail count and automatically recorded message count are notified (step S611). In this case, the received mail count is calculated by the received mail management portion 200, and the value of an automatically recorded message count 320 is used as this automatically recorded message count.

If it is determined on the basis of automatically recorded data 121 and transfer setting information 120 that there is an automatically recorded message to be transferred (YES in step S612), the message recorded in an automatically recorded message main body 310 of the automatically recorded data 121 is played back and transferred through the line control unit 111 and communication line 101. A state 302 indicating whether or not the automatically recorded message has been played back in an automatically message management portion 300 which corresponds to the message is changed to a state indicating that the message has been played back, and a state 303 indicating whether or not the automatically recorded message has been transferred is changed to a state indicating that the message has been transferred (step S613).

The transfer control unit 119 determines on the basis of the transfer setting information 120 whether or not each e-mail stored in a received mail file 114 by an e-mail management unit 113 is mail to be transferred. If there is no mail to be transferred (NO in step S614), the line control unit 111 disconnects the connected line (step S619), and the terminal returns to the standby state.

If it is determined that there is e-mail to be transferred (YES in step S614), the corresponding e-mail is read out from the received mail file 114, and a voice synthesizing unit 117 copies the mail to a text data area 115 (step S615). The voice synthesizing unit 117 then converts the e-mail in the text data area 115 into voice data by referring to a voice synthesis dictionary 116 (step S616). A voice output unit 118 plays back the voice data converted by the voice synthesizing unit 117 and transfers it through the line control unit 111 and communication line 101 (step S617). In this case, a state 205 indicating whether the mail has been transferred in the received mail management portion 200 which corresponds to the transferred received mail is changed to a state indicating that the mail has been transferred.

If e-mail to be transferred is copied to the text data area 115 and transferred while being converted into voice data in this manner, and all the e-mail in the text data area 115 is transferred (YES in step S618), it is continuously determined whether or not there is any corresponding e-mail in the received mail file 114 (step S614). If all the corresponding e-mail is transferred (NO in step S614), the connected line is disconnected (step S619), and the terminal returns to the standby state.

In this case, the transfer order of automatically recorded message and e-mail may be reversed. In addition, both messages and e-mail may be sorted together in the terminating date order or the like and transferred.

According to the second embodiment, when data recorded on the e-mail at home or the like is to be checked from a portable terminal or the like on the road, two types of data, i.e., automatically recorded messages and e-mail, can be acquired as one type of data, i.e., voice data, owing to voice synthesis.

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk (registered trademark), a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention can be applied to home fixed telephone sets, internet telephone sets, and the like.

As many apparently widely different embodiments of the present invention can be made without departing from the spirit and scope thereof, it is to be understood that the invention is not limited to the specific embodiments thereof except as defined in the appended claims.

CLAIM TO PRIORITY

This application claims priority from Japanese Patent Application No. 2003-310225 filed on Sep. 2, 2003, which is hereby incorporated by reference herein.

What is claimed is:

1. A communication terminal apparatus which converts text data into voice data, transfers the voice data automatically, and performs voice communication in response to an incoming call from a remote device, comprising:

recording means for recording a message from a remote device by using an answering function when a response to an incoming call from the remote device from which the message is to be recorded is not performed by a called party;

reception means for receiving e-mail from a remote device through a communication line;

conversion means for converting text data of the e-mail received by said reception means into voice data;

setting means for setting a predetermined communication terminal apparatus as a transfer destination; and transfer means for automatically transferring the e-mail received by said reception means and converted by the conversion means and/or the message recorded by said recording means to the predetermined communication terminal apparatus as the voice data, on the basis of information set by a user as to whether or not to transfer the e-mail and/or the message, respectively, when the reception or the recording is performed, wherein said transfer means transfers a count of e-mails received and a count of messages recorded together with the e-mail and the message.

2. A transfer method for a communication terminal apparatus which converts text data into voice data, transfers the voice data automatically, and performs voice communication in response to a call request from a remote device, the method comprising:

a recording step of recording a message from a remote device by using an answering function when a response to an incoming call from the remote device from which the message it to be recorded is not performed by a called party;

a reception step of receiving e-mail from a remote device through a communication line;

a conversion step of converting text data of the e-mail received in the reception step into voice data;

a setting step of setting a predetermined communication terminal apparatus as a transfer destination; and a transfer step of automatically transferring the e-mail received in the reception step and converted in the conversion step and/or the message recorded in the recording step to the predetermined communication terminal apparatus as the voice data, on the basis of information set by a user as to whether or not to transfer the e-mail and/or the message, respectively, when the reception or the recording is performed, wherein, in said transfer step, a count of e-mails received and a count of messages recorded are transferred together with the e-mail and the message.

3. A computer-readable recording medium on which is stored a computer-executable program for a transfer method for a communication terminal apparatus which converts text data into voice data, transfers the voice data automatically, and performs voice communication in response to a call request from a remote device, the program comprising computer-executable code that, when executed, performs the steps of:

a recording step of recording a message from a remote device by using an answering function when a response to an incoming call from the remote device from which the message is to be recorded is not performed by a called party;

a reception step of receiving e-mail from a remote device through a communication line;

a conversion step of converting text data of the e-mail received in the reception step into voice data;

a setting step of setting a predetermined communication terminal apparatus as a transfer destination; and a transfer step of automatically transferring the e-mail received in the reception step and converted in the conversion step and/or the message recorded in the recording step to the predetermined communication terminal apparatus as the voice data, on the basis of information set by a user as to whether or not to transfer the e-mail and/or the message, respectively, when the reception or the recording is performed, wherein, in said transfer step, a count of e-mails received and a count of messages recorded are transferred together with the e-mail and the message.

* * * * *

UNITED STATES PATENT AND TRADEMARK OFFICE
CERTIFICATE OF CORRECTION

| | |
|---|---|
| PATENT NO. | : 7,280,641 B2 |
| APPLICATION NO. | : 10/926941 |
| DATED | : October 9, 2007 |
| INVENTOR(S) | : Kogure |

It is certified that error appears in the above-identified patent and that said Letters Patent is hereby corrected as shown below:

COVER PAGE:
ITEM (56) FOREIGN PATENT DOCUMENTS,
"JP 2110-077942  3/2001" should read -- JP 2001-077942  3/2001 --;
"JP 05199295      8/1993" should read -- JP 5-199295      8/1993 --;
"JP 11177791      7/1999" should read -- JP 11-177791     7/1999 --;
"JP 20001077942 3/2001" should read -- JP 2001-77942    3/2001 --;
"JP 2002077366   3/2002" should read -- JP 2002-77366    3/2002 --; and
"JP 2002152320   5/2002" should read -- JP 2002-152320  5/2002 --.

SHEET 2:
FIG. 2, in Reference Numeral 211, "INFORM YOU" should read -- INFORM YOU OF --.

COLUMN 4:
Line 42, "automatically" should read -- automatically recorded --;
Line 53, "automatically" should read -- automatically recorded --; and
Line 60, "automatically" should read -- automatically recorded --.

COLUMN 6:
Line 37, "automatically" should read -- automatically recorded --.

COLUMN 8:
Line 21, "automatically" should read -- automatically recorded --.

UNITED STATES PATENT AND TRADEMARK OFFICE
CERTIFICATE OF CORRECTION

PATENT NO. : 7,280,641 B2
APPLICATION NO. : 10/926941
DATED : October 9, 2007
INVENTOR(S) : Kogure It is certified that error appears in the above-identified patent and that said Letters Patent is hereby corrected as shown below:

COLUMN 10:
Line 16, "it to be" should read -- is to be --.

Signed and Sealed this

Tenth Day of June, 2008

JON W. DUDAS
*Director of the United States Patent and Trademark Office*